United States Patent
Lhospitalier (10) Patent No.: US 11,420,405 B2
(45) Date of Patent: Aug. 23, 2022

(54) METHOD FOR PRODUCING WEBS FOR REINFORCEMENT PLY OF A TIRE BY BUTT-JOINING STRAIGHT-WIRE STRIPS

(71) Applicant: Compagnie Generale Des Etablissements Michelin, Clermont-Ferrand (FR)

(72) Inventor: Jean-Francois Lhospitalier, Clermont-Ferrand (FR)

(73) Assignee: Compagnie Generale Des Etablissements Michelin, Clermont-Ferrand (FR)

( * ) Notice: Subject to any disclaimer, the term of this patent is extended or adjusted under 35 U.S.C. 154(b) by 313 days.

(21) Appl. No.: 16/767,243

(22) PCT Filed: Nov. 30, 2018

(86) PCT No.: PCT/FR2018/053072
§ 371 (c)(1),
(2) Date: May 27, 2020

(87) PCT Pub. No.: WO2019/106322
PCT Pub. Date: Jun. 6, 2019

(65) Prior Publication Data
US 2020/0384713 A1    Dec. 10, 2020

(30) Foreign Application Priority Data
Dec. 1, 2017   (FR) ...................................... 1761538

(51) Int. Cl.
*B29C 43/24*    (2006.01)
*B29C 43/28*    (2006.01)
(Continued)

(52) U.S. Cl.
CPC .............. *B29D 30/46* (2013.01); *B29C 43/24* (2013.01); *B29C 43/28* (2013.01); *B29C 65/54* (2013.01);
(Continued)

(58) Field of Classification Search
CPC ......... B29C 43/24; B29C 43/28; B29C 65/42; B29C 65/425; B29C 65/54;
(Continued)

(56) References Cited

U.S. PATENT DOCUMENTS 3,584,528 A * 6/1971 Leblond .................. B29D 30/46
83/578
4,931,126 A * 6/1990 McCarville ............. B29C 66/43
156/304.6
(Continued)

FOREIGN PATENT DOCUMENTS

EP    1674246 A1    6/2006
EP    3199311 A1    8/2017
(Continued)

OTHER PUBLICATIONS

International Search Report issued in PCT/FR2018/053072 dated Jun. 6, 2019.

*Primary Examiner* — Michael A Tolin
(74) *Attorney, Agent, or Firm* — Dickinson Wright PLLC; Steven C. Hurles (57) ABSTRACT

The present invention relates to a method for manufacturing webs (1) that are intended to be involved in the makeup of a reinforcing ply (2) for a pneumatic tyre (20), said method comprising a preparation step (a), during which a plurality of straight-thread strips (7, 107, 207), which are each formed of a plurality of continuous reinforcing threads (4) that are embedded in a layer of rubber (5), are prepared, a butt-joining step (b), during which said straight-thread strips (7,
(Continued)

107, 207) are butt-joined in pairs to form a straight-thread ply (3), then a cutting step (c), during which the straight-thread ply (3) is inserted into a cutter (8) and the straight-thread ply (3) is severed transversely so as to form webs, wherein, in said method, the frontal width (W3) of the straight-thread ply (3) that is produced during the butt-joining step (b) and then inserted into the cutter (8) is equal to or greater than 50%, equal to or greater than 75%, equal to or greater than 80%, or even equal to or greater than 90%, of the cutter inlet width (W8), whereas the widest frontal width (W7, W107, W207) of the straight-thread strips is less than or equal to 50%, less than or equal to 40%, less than or equal to 25%, less than or equal to 10%, or even less than or equal to 5%, of said cutter inlet width (W8).

<p align="center">13 Claims, 2 Drawing Sheets</p>

(51) Int. Cl.
| | | |
|---|---|---|
| | *B29C 65/54* | (2006.01) |
| | *B29D 30/38* | (2006.01) |
| | *B29D 30/42* | (2006.01) |
| | *B29D 30/46* | (2006.01) |
| | *B29K 105/10* | (2006.01) |
| | *B29C 65/00* | (2006.01) |

(52) U.S. Cl.
CPC ........ *B29C 66/1142* (2013.01); *B29C 66/435* (2013.01); *B29C 2793/009* (2013.01); *B29C 2793/0063* (2013.01); *B29D 2030/381* (2013.01); *B29D 2030/422* (2013.01); *B29D 2030/466* (2013.01); *B29K 2105/106* (2013.01)

(58) Field of Classification Search
CPC ............. B29C 66/02241; B29C 66/112; B29C 66/1122; B29C 66/114; B29C 66/1142; B29C 66/116; B29C 66/1162; B29C 66/435; B29C 70/20; B29C 2793/0036; B29C 2793/0063; B29C 2793/009; B29D 30/38; B29D 30/42; B29D 30/46; B29D 2030/381; B29D 2030/421; B29D 2030/422; B29D 2030/423; B29D 2030/427; B29D 2030/466; B29K 2105/08; B29K 2105/10; B29K 2105/101; B29K 2105/105; B29K 2105/106; B29L 2030/003

See application file for complete search history.

(56) References Cited

U.S. PATENT DOCUMENTS

| | | | | |
|---|---|---|---|---|
| 8,201,608 | B2* | 6/2012 | Pilpel | ............. B32B 37/06 |
| | | | | 156/499 |
| 8,636,863 | B2* | 1/2014 | Love | ............. B29C 65/526 |
| | | | | 156/544 |

FOREIGN PATENT DOCUMENTS

| | | |
|---|---|---|
| EP | 3238925 A1 | 11/2017 |
| WO | 2008077418 A1 | 7/2008 |
| WO | 2013048384 A1 | 4/2013 |

\* cited by examiner

METHOD FOR PRODUCING WEBS FOR REINFORCEMENT PLY OF A TIRE BY BUTT-JOINING STRAIGHT-WIRE STRIPS

CROSS-REFERENCE TO RELATED APPLICATION

The present application claims priority to PCT International Patent Application No. PCT/FR2018/053072, filed Nov. 30, 2018, which claims the benefit of French Patent Application No. 1761538, filed Dec. 1, 2017.

BACKGROUND OF THE INVENTION

1. Field of the Invention

The present invention relates to the field of manufacturing tires, and in particular pneumatic tires intended to be fitted to rolling vehicles.

The present invention relates more particularly to the manufacture of reinforcing plies that are used in the structure of such tires.

2. Related Art

It is known practice to create reinforcing plies by first of all producing, by calendering, a ply known as a straight-thread ply, which comprises a plurality of reinforcing plies that are oriented parallel to the longitudinal direction of said ply and are embedded in a rubber, then by cutting out of this straight-thread ply, using a cutter, at a predetermined cutting angle, portions of straight-thread ply known as "webs", then by butt-joining said webs in pairs by way of their selvedges, parallel to the reinforcing threads, so as to finally form a reinforcing ply, within which the reinforcing threads form, with respect to the longitudinal direction of said ply, an angle, known as the "ply angle", that results from the cutting angle chosen.

In order to standardize and optimize production equipment for manufacturing tires on a mass-production scale, manufacturers of tires, in particular pneumatic tires, have generally defined, for their production lines, a standard straight-thread ply width format, or sometimes several standard straight-thread ply width formats, of limited number, and developed, for each standard width format, for the one part calenders that create, by embedding reinforcing threads between two layers of rubber, straight-thread plies, the frontal width of which corresponds to this standard width format, and for the other part cutters, the cutting capacities of which are likewise suitable, and optimized, for this standard width format.

Furthermore, the reinforcing threads used by the calenders are generally packaged in the form of reels that contain a great storage length of each thread, typically around 5000 m to 10 000 m, or even 30 000 m, per reinforcing thread and per reel.

To ensure the production of a high-quality straight-thread ply, these reinforcing threads have to be positioned suitably at the inlet of the calender, parallel to one another and spaced apart from one another at a given pitch. To this end, the inlet of the calender is provided with a structure intended to carry and unwind the reels of reinforcing threads, such as a rack, and also suitable guide means for positioning the reinforcing threads.

In order to limit operations of handling and fitting the reinforcing threads, and thus to optimize the productivity of the calenders, it is highly preferable, once all of the numerous reinforcing threads have been fitted on the guide structure, to carry out continuous calendering until the available reinforcing thread has run out.

In practice, the surface area of straight-thread ply produced by a calender during a single calendering operation, also known as a "calendering run", is therefore generally determined by the total storage length of the reinforcing threads contained on the reel(s) used for feeding the calender, and, more particularly, said surface area of straight-thread ply produced during a single calendering run is generally substantially equal to the product of the frontal width of the straight-thread ply, which exits the calender, and the total storage length of the reinforcing threads, which are entirely used up during said calendering operation.

However, the need has recently arisen to produce tires in series of which the size, that is to say the total number of tires making up the series of tires in question, is smaller than before, in particular in order to comply with more specific markets.

Typically, series of which the size could be around several hundred tires could in particular be targeted.

At first sight, existing production equipment appears to be poorly adapted to such limited-series manufacturing.

This is because a series of small size involves a smaller requirement for reinforcing ply, and consequently requires a smaller surface area of straight-thread ply.

Of course, to reduce the surface area of straight-thread ply produced, it could be conceivable to reduce the length of said straight-thread ply by interrupting the calendering operation once the desired length has been reached.

However, interrupting the calendering operation would have the drawback of immobilizing the calender and of increasing the number of interventions involving handling and fitting reinforcing threads, to the detriment of the productivity of the calender.

It could likewise be conceivable to produce a straight-thread ply in one piece, using up all the reinforcing threads, and then to store the excess length of straight-thread ply produced, which is not used for the series in question, on standby for a possible future use.

However, given that not only is storage accompanied by an ageing phenomenon that is liable to impair the properties of the materials, and in particular of the rubber, and therefore more generally of the straight-thread ply stored, but it is also difficult to ensure that an excess of straight-thread ply having characteristics specific to a first series of tires could effectively be reused, let alone reused entirely, for a different second series of tires, such a storage solution would inevitably result in a certain wastage of raw material and energy.

Another possibility could consist in producing by calendering a straight-thread ply of reduced width, chosen such that the product of said reduced width and the storage length of reinforcing threads would be substantially equal to the surface area of straight-thread ply that is just necessary to manufacture the series of tires in question.

However, the output of cutters, which is expressed in surface area of webs produced per unit time, depends on the rate of the cutter, that is to say the number of cuts that can be performed by unit time by actuating the cutter, and on the width of the entering straight-thread ply with which the cutter is fed.

In this regard, it will be noted that, in absolute terms, increasing the rate of the cutter would inevitably cause an acceleration of the wearing of the cutting member of said cutter (which cutting member may be for example a blade of the guillotine type or a cutting disc), and would necessitate more frequent, and therefore more expensive, maintenance.

In concrete terms, the output of a cutter therefore depends generally essentially on the width of the entering straight-thread ply, which is cut upon each actuation of the cutting member.

Consequently, feeding existing cutters with a straight-thread ply of reduced width would bring about a drop in output of said cutters.

Moreover, the European Patent EP-1 712 346 discloses a device that makes it possible to create a straight-thread ply by spirally winding, and butt-joining to itself, a straight-thread strip on a set of two horizontal cylinders, and directly removing a reinforcing ply from this straight-thread ply, continuously, by means of a cutter applied to one of the cylinders.

However, such a device exhibits a high level of complexity and requires numerous adjustments in particular to position the knife in terms of length and yaw with respect to the axis of the cylinder, in order to define in particular the width of the removed reinforcing ply, or to adjust the centre-to-centre distance of the cylinders, which conditions the length of the portions of strips within the reinforcing ply, and which therefore conditions the ply angle, for a given reinforcing ply width.

Such a device can therefore prove to be relatively expensive to implement, and have certain weaknesses as regards reliability.

SUMMARY OF THE INVENTION

Therefore, the objects assigned to the invention aim to remedy the abovementioned drawbacks and to propose a method for producing webs, and more generally reinforcing plies, which is reliable, versatile, so as to be able to adapt to operations of manufacturing tires in series of very varied sizes, while avoiding the wastage of raw material and making it possible to optimize the output and maintenance costs of the cutters.

More particularly, the disclosure aims to provide a method that can be implemented, at reduced cost, on existing installations, in particular existing cutters, while maintaining the output and also the benefit of the robustness of said installations.

The objects assigned to the disclosure are achieved by means of a method for manufacturing webs that are intended to be involved in the makeup of a reinforcing ply for a tire, said method being characterized in that it comprises the following steps:
  (i) a preparation step (a), during which a plurality of separate reels are prepared, each containing a strip, known as a "straight-thread strip", which is formed of a plurality of continuous reinforcing threads that are embedded in at least one layer of rubber and extend parallel to one another in the longitudinal direction of said strip, each of said straight-thread strips having, perpendicularly to its reinforcing threads, a predetermined width known as the "frontal width"; then
  (ii) a butt-joining step (b), during which the straight-thread strips contained on said plurality of separate reels are unwound simultaneously, and said straight-thread strips are butt-joined in pairs in one and the same common longitudinal direction, so as to combine all of said straight-thread strips into a straight-thread ply, the reinforcing threads of which extend in the common longitudinal direction, and which has, perpendicularly to said reinforcing threads, a straight-thread ply frontal width that is greater than the individual frontal width of each straight-thread strip; then
  (iii) a cutting step (c), during which the straight-thread ply is inserted into a cutter that has a given maximum cutting capacity, known as the "cutter inlet width", which corresponds to the largest frontal width of a straight-thread ply that can be inserted into the inlet of said cutter, then, by means of said cutter, the straight-thread ply is severed transversely, several times over, in a cutting direction that is secant to the direction of the reinforcing threads, so as to form portions of straight-thread ply known as "webs" of predetermined length;
and in that the frontal width of the straight-thread ply that is produced during the butt-joining step (b) and then inserted into the cutter during the cutting step (c) is equal to or greater than 50%, preferably equal to or greater than 75%, preferentially equal to or greater than 80%, or even equal to or greater than 90%, of the cutter inlet width, whereas the widest frontal width of the straight-thread strips that are butt-joined to make said straight-thread ply is less than or equal to 50%, preferably less than or equal to 40%, preferentially less than or equal to 25%, optionally, preferably, less than or equal to 10%, or even less than or equal to 5%, of said cutter inlet width.

Advantageously, the method according to the disclosure makes it possible to combine production of straight-thread strips over a small width, using a method that is thus economical in terms of preparation time and of raw material, with cutting of a straight-thread ply of large width, which makes it possible to optimize the output of the cutters.

The link between the operation of creating straight-thread strips of small frontal width, in this case preferably a calendering operation, and the cutting operation, which consumes a straight-thread ply that is desired to be as wide as possible, and more particularly as close as possible to the maximum receiving capacity of the cutter, is advantageously realized by virtue of intermediate butt-joining, which makes it possible to longitudinally join together a plurality of straight-thread strips continuously along their entire length so as to convert said initially separate, and relatively narrow, strips produced by calendering into a single straight-thread ply with a width more appropriate for the cutter used.

The disclosure therefore advantageously makes it possible to distribute the manufacturing of the total useful surface area of a straight-thread ply, which is necessary for manufacturing the series of tires in question, to a plurality of sub-surface areas corresponding to the unit surface area of each straight-thread strip.

More particularly, the disclosure can make it possible to manufacture the entire total useful surface area of the straight-thread ply by producing a straight-thread strip, the frontal width of which is chosen such that the unit surface area of said straight-thread strip is equal to the intended total useful surface area on the one hand and also coincides substantially with the product of the frontal width of said strip and a standard reinforcing thread storage length on the other hand. In this way, it is possible to produce the entirety of the useful surface area from one and the same calendering operation, of small width, which consumes the entire length of the reinforcing threads supplying the calender.

BRIEF DESCRIPTION OF THE DRAWINGS

Further subjects, features and advantages of the disclosure will become apparent in more detail from reading the following description and with the aid of the appended drawings, which are provided purely by way of illustration and without limitation and in which.

DETAILED DESCRIPTION OF THE ENABLING EMBODIMENT

The present disclosure relates to a method for manufacturing webs 1 that are intended to be involved in the makeup of a reinforcing ply 2 for a tire 20, and more preferably for a pneumatic tire 20.

For the simple convenience of the description, in the following text the terms "tire" and "pneumatic tire" could be equated, it being clearly understood that the disclosure can be applied to the building of all types of tires, including solid, non-pneumatic, tires that are intended for example for puncture-resistant wheels having a cellular internal structure.

Figure 3:
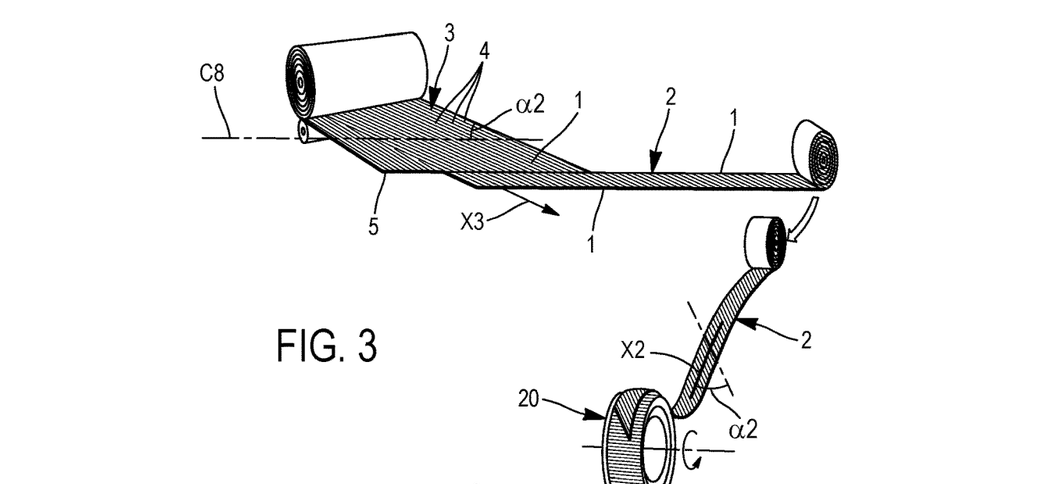
FIG. 3 illustrates a schematic perspective view of the general principle, known per se, of butt-joining webs to form a reinforcing ply, and then of using said reinforcing ply in the manufacture of a tire.

The reinforcing ply 2 could serve for example as a carcass ply, or as a crown ply intended to reinforce the crown of the tire 20, under the tread, as is illustrated in FIG. 3.

Figure 2A:
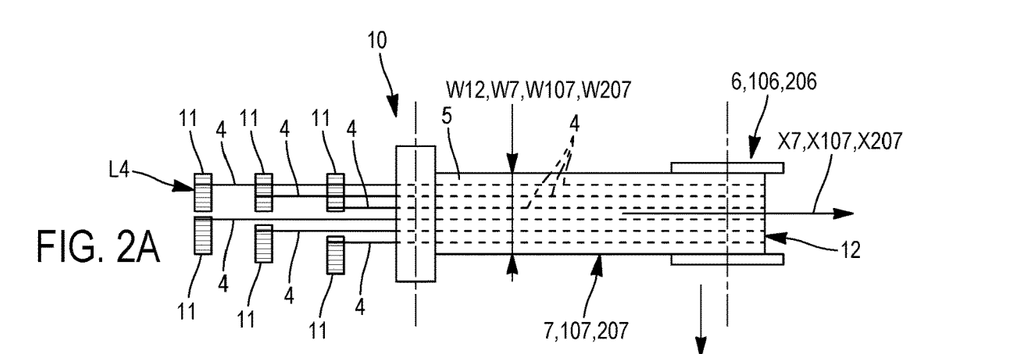
FIG. 2A illustrates a schematic view of a step (a) of preparing straight-thread strips, by calendering, using a method for manufacturing webs in accordance with the disclosure.
Figure 2B:
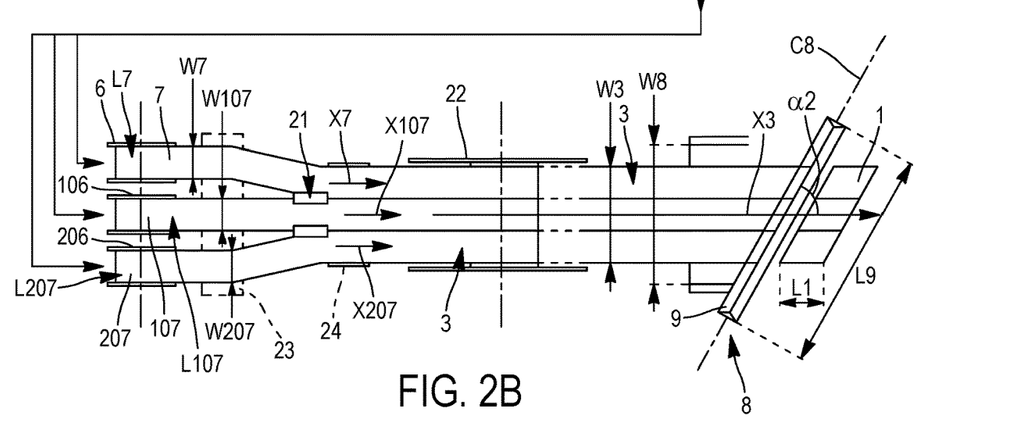
FIG. 2B illustrates a schematic view of operations in the method that are carried out downstream of the operations in FIG. 2A so as to use the straight-thread strips for the butt-joining step (b) and then the cutting step (c).

In a manner known per se, and as is illustrated in FIGS. 2B and 3, and as will be described in detail below, a web 1 corresponds to a portion of a straight-thread ply 3 taken from said straight-thread ply 3 by a cutting operation effected in a cutting direction C8 that is secant to the longitudinal direction X3 of said straight-thread ply 3.

A "straight-thread ply" 3 denotes a ply formed by a plurality of continuous reinforcing threads 4 that are disposed in a manner parallel to one another and parallel to the longitudinal direction X3 of the ply and are embedded in a rubber 5.

The reinforcing threads 4 can be made of metallic material or of textile material, such as nylon or aramid, or any other appropriate material having a modulus of elasticity greater than that of the rubber 5. Each reinforcing thread 4 may be a monofilament, that is to say formed from a single integral strand, or a multifilament, that is to say formed from a plurality of strands combined to form a cord.

The term "rubber" 5 denotes an elastomer material, based on uncured, i.e. unvulcanized, rubber or based on a mixture of uncured rubbers, wherein said rubber(s) may be synthetic or natural.

Of course, said rubber 5 may contain fillers, such as silica or carbon black, adjuvants, such as sulfur, plasticizers, such as oils, etc.

The method according to the disclosure comprises first of all a preparation step (a), during which a plurality of separate reels 6, 106, 206 are prepared, each containing a strip 7, 107, 207, known as a "straight-thread strip", which is formed of a plurality of continuous reinforcing threads 4 that are embedded in at least one layer of rubber 5 and extend parallel to one another in the longitudinal direction X7, X107, X207 of said strip, each of said straight-thread strips 7, 107, 207 having, perpendicularly to its reinforcing threads, a predetermined width known as the "frontal width" W7, W107, W207.

Preferably, as is illustrated in FIG. 2A, the straight-thread strip 7, 107, 207 will be produced by a calendering operation, the reinforcing threads 4 that are disposed parallel to one another being inserted between two layers of rubber 5 (also known as "skim of rubber"), which are pressed together by means of counter-rotating cylinders.

Such a calendering operation can be carried in particular by means of a calender 10 (calendering machine) as described in the patent application WO-2017/093681 filed by the applicant.

Of course, without departing from the scope of the disclosure, any other method suitable for manufacturing the straight-thread strips by coating reinforcing threads 4 in a rubber 5 could be used, for example extrusion/sheathing methods.

Figure 1:
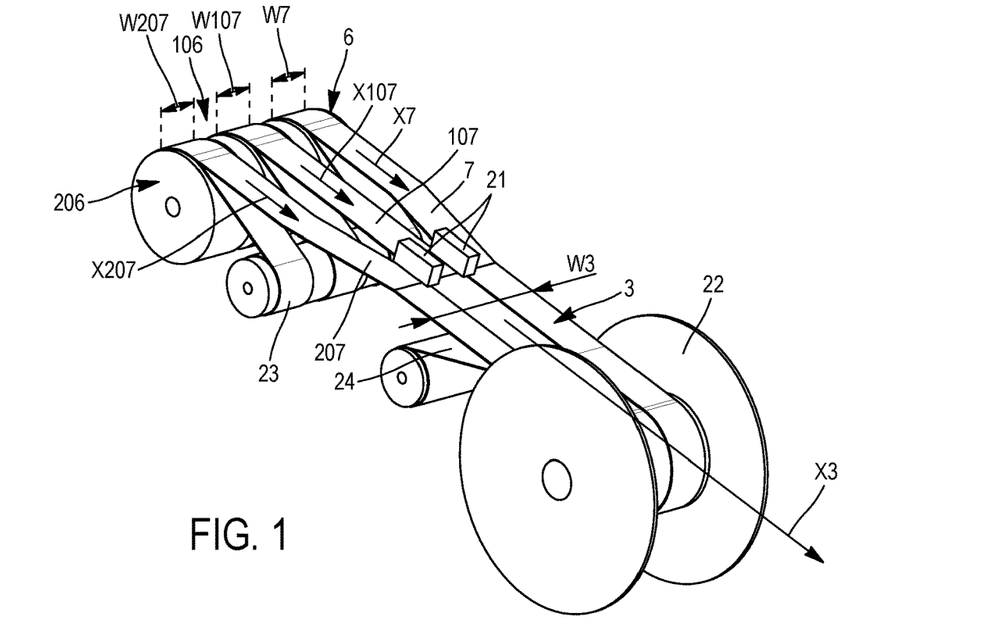
FIG. 1 illustrates a perspective view of a butt-joining installation for implementing a step (b) of longitudinally butt-joining a plurality of straight-thread strips according to the disclosure.

According to the disclosure, the method then comprises, after the preparation step (a), a butt-joining step (b), during which, as can be seen in particular in FIG. 1 and in the left-hand part of FIG. 2B, the straight-thread strips 7, 107, 207 contained on said plurality of separate reels 6, 106, 206 are unwound simultaneously, and said straight-thread strips 7, 107, 207 are butt-joined in pairs in one and the same common longitudinal direction X3, so as to combine all of said straight-thread strips 7, 107, 207 into a straight-thread ply 3, the reinforcing threads 4 of which extend in the common longitudinal direction X3, and which has, perpendicularly to said reinforcing threads 4, a straight-thread ply frontal width W3 that is greater than the individual frontal width W7, W107, W207 of each straight-thread strip 7, 107, 207.

The butt-joining could be carried out using any known method, and thus using any appropriate butt-joining station 21, for example by means of rollers that force the selvedges of the straight-thread strips 7, 107, 207 to move towards one another and to adhere to one another.

Preferably, in a manner known per se, in order to avoid the turns of straight-thread strips, or the turns of straight-thread ply 3, respectively, adhering to one another within the reels 6, 106, 206, provision could be made to interpose between said turns, as is illustrated in FIG. 1, inserts 23, 24 formed by films of fabric, or films made of plastics material, which are wound and unwound jointly with said strips or plies.

The method then comprises, after the butt-joining step (b), and as is illustrated in particular in the right-hand part of FIG. 2B, a cutting step (c), during which the straight-thread ply 3 is inserted into a cutter 8, then, by means of said cutter 8, the straight-thread ply 3 is severed transversely, several times over, in a cutting direction C8 that is secant to the direction X3 of the reinforcing threads 4, so as to form portions of straight-thread ply known as "webs" 1 of predetermined length L1.

Note that, for simple convenience of the description, the "length" L1 of the webs corresponds here to the dimension of the web 1 measured in the longitudinal direction X3 of the straight-thread ply from which the web 1 has been produced, that is to say to the distance interval between two cuts carried out successively by the cutter 8 along the straight-thread ply 3, and not necessarily to the greatest dimension of the web 1 obtained.

In a manner known per se, the webs 1 are then butt-joined to one another, by way of their selvedges parallel to the reinforcing threads 4, so as to form a reinforcing ply 2, as is illustrated in FIG. 3.

In practice, the angle, known as the "cutting angle", formed between the cutting direction C8 and the common longitudinal direction X3 of the reinforcing threads 4 of the straight-thread ply 3 entering the cutter 8 will define, and more particularly will be equal to, the angle known as the "ply angle"—2 at which the reinforcing threads 4 are finally oriented with respect to the longitudinal direction X2 of the reinforcing ply 2.

For convenience, the cutting angle and ply angle $\alpha 2$ could thus be equated in the following text.

Note that the straight-thread ply 3 produced by the butt-joining step (b) could be conveyed towards the inlet of the cutter 8 either directly, by being driven as far as said cutter 8 as said straight-thread ply 3 is leaving the butt-joining station 21, or indirectly, by being stored temporarily, at the outlet of the butt-joining station 21, on a buffer reel 22, which will then be fitted at the inlet of the cutter 8 in order to be unrolled there in the course of the cutting into webs 1.

The cutter 8 has a given maximum cutting capacity, known as the "cutter inlet width" W8.

This cutter inlet width W8 corresponds to the greatest frontal width of a straight-thread ply 3 that can be inserted at the inlet of said cutter 8.

The cutter 8 is designed to be able to cut the entering straight-thread ply 3 at a given ply angle $\alpha 2$, or, preferably, the cutter 8 is designed so as to be able to be configured with a ply angle $\alpha 2$ freely chosen from a plurality of possible ply angles, for example from a range of ply angles of between 5 degrees and 90 degrees.

Note that a ply angle $\alpha 2$ corresponds typically to the majority of the reinforcing plies known as "carcass plies" that are intended to form the radial carcass of the tire.

The inlet width W8 of the cutter 8 then corresponds to the greatest frontal width W3 of a straight-thread ply 3 that can be introduced into the cutter 8 and cut at the ply angle $\alpha 2$, or at any one of the ply angles $\alpha 2$ for which the cutter may be configured.

In practice, as is illustrated in FIG. 2B, the cutter 8 could have a rectilinear blade 9, of the guillotine or sheet-cutter type, the length L9 of which is greater than the length of the cutting line necessary for separating the straight-thread ply 3 into two portions, that is to say for separating a web 1 of the straight-thread ply 3 in a cutting operation, regardless of the chosen value of the ply angle $\alpha 2$.

In a variant, it could of course be possible to use, within the cutter 8, a cutting member other than a blade 9 of the guillotine type, for example a cutting disc that rolls along a rail oriented in the desired cutting direction C8.

Preferably, the cutter inlet width W8 is between 300 mm and 2000 mm, and more preferably between 700 mm and 1600 mm.

For example, the cutter inlet width W8 could be equal to 800 mm, to 1000 mm, to 1200 mm, to 1400 mm or to 1600 mm.

Such widths W8 correspond advantageously to the usual inlet widths of existing cutters 8, and will thus make it possible to use such existing cutters 8.

By way of indication, the length L9 of the blade 9 of the cutter 8 could be equal to 4800 mm, in order for it to be possible to treat and sever in a single cutting movement an entering straight-thread ply 3 having a frontal width W3 of 1400 mm at a cutting angle (and thus a ply angle $\alpha 2$) that can range from 90 degrees to 17 degrees, or be equal to 5600 mm, in order for it to be possible to treat, over the same range of cutting angles, a straight-thread ply 3 having a frontal width W3 of 1600 mm.

According to the disclosure, the frontal width W3 of the straight-thread ply 3 that is produced during the butt-joining step (b) and then inserted into the cutter 8 during the cutting step (c) is equal to or greater than 50% of the cutter inlet width W8, preferably equal to or greater than 75% of the cutter inlet width W8, preferentially equal to or greater than 80% of the cutter inlet width W8, or even equal to or greater than 90% of the cutter inlet width W8, whereas the widest frontal width W7, W107, W207 of the straight-thread strips 7, 107, 207 that are butt-joined to make said straight-thread ply 3 is less than or equal to 50% of said cutter inlet width W8, preferably less than or equal to 40% of said cutter inlet width W8, preferentially less than or equal to 25% of said cutter inlet width W8, optionally, preferably, less than or equal to 10% of said cutter inlet width W8, or even less than or equal to 5% of said cutter inlet width W8.

As indicated above, the distribution of the useful surface area of the straight-thread ply 3 to a plurality of straight-thread strips 7, 107, 207 of smaller width that are manufactured separately and then butt-joined makes it possible to reconcile, on the one hand, production in the form of said straight-thread strips 7, 107, 207 of the whole surface area necessary for manufacturing the straight-thread ply 3, thereby making said production, realized preferably by calendering, rapid and economical in terms of time, raw material and energy, with, on the other hand, a high output of a cutter 8 having a large inlet width W8, thereby making it possible to produce webs 1 with a high surface throughput of webs 1 (that is to say with a high surface area of webs produced per unit time).

Advantageously, by limiting the width of the straight-thread strips 7, 107, 207, and consequently by limiting the number of parallel reinforcing threads 4 that are necessary for calendering, it is possible in particular to reduce the time for supplying and preparing the calender 10.

Moreover, a smaller number of reinforcing threads 4 will make it easier to control the calendering operation and will thus improve the reliability of this operation.

More preferentially, the widest of the straight-thread strips 7, 107, 207 used has a frontal width W7, W107, W207 of between 5% and 20% of the cutter inlet width W8.

More generally and more preferentially, each straight-thread strip 7, 107, 207 used has a unit frontal width W7, W107, W207 of between 5% and 20% of the cutter inlet width W8.

Similarly, in a particularly preferential manner, and in particular in combination with unit frontal widths W7, W107, W207 of straight-thread strips of between 5% and 20% of the cutter inlet width W8, the width of the straight-thread ply 3 that is introduced into the inlet of the cutter 8 will have a frontal width W3 of between 80% and 100%, or between 90% and 100%, of the cutter inlet width W8, in order to maximize the output of said cutter 8.

Preferably, the straight-thread strips 7, 107, 207 each have a frontal width W7, W107, W207 that is between 30 mm and 700 mm, and more preferentially between 40 mm and 200 mm.

Of course, in order to streamline the manufacture of the straight-thread strips 7, 107, 207, the choice could be made to employ one or more standardized formats for the frontal widths W7, W107, W207 of strips, for example 40 mm, 50 mm, 100 mm, 120 mm or 160 mm.

Such standardized formats could advantageously correspond to submultiples, for example 1/2, 1/4, 1/5, 1/9, 1/10, of the usual width formats W3 of the straight-thread plies 3 that are currently provided for use.

More particularly, such formats of frontal widths W7, W107, W207 of strips could correspond to submultiples, for example 1/2, 1/4, 1/5, 1/9, 1/10, of the abovementioned cutter inlet widths W8.

In a particularly preferential manner, use will be made, among the possibilities listed above, of the formats of 1/2, 1/5 and 1/9.

Furthermore, during the calendering operation, the straight-thread strips 7, 107, 207 could be deburred, that is to say have material removed, by cutting the rough edges produced by calendering, in order to level the frontal width of the straight-thread strips at the chosen value and to improve the quality of the selvedges of said straight-thread strips before butt-joining.

The values and ranges of frontal widths W7, W107, W207 of straight-thread strips 7, 107, 207 that are proposed above, whether expressed in relative values in the form of percentages of the cutter inlet width W8 or in terms of absolute values, advantageously present a good compromise between a width that is small enough to limit, given the storage length of the reinforcing threads 4, the size of the surface area of straight-thread strip 7, 107, 207 produced during a single calendering run to a value that subsequently makes it possible to produce a useful surface area, which is just necessary and sufficient, of the straight-thread ply 3 for the desired production of webs 1 and for the size of the intended series of tires, while being large enough to allow the production, by butt-joining a reasonable whole number of straight-thread strips 7, 107, 207, of a straight-thread ply 3, the frontal width W3 of which ensures a satisfactory output during the cutting operation in which said straight-thread ply 3 is cut into webs 1.

Such frontal widths W7, W107, W207 of the straight-thread strips thus give the method a great deal of flexibility in terms of adaptability to different sizes of series of tires, and a high degree of freedom of choice of the format of straight-thread ply 3.

The disclosure therefore confers a high degree of versatility on production installations.

The frontal width W7, W107, W207 of the straight-thread strip 7, 107, 207 is also chosen to be large enough to ensure that the straight-thread strip 7, 107, 207 exhibits good integrity while it is being manufactured and while it is being conveyed in a guided manner within the calender 10 and then at the butt-joining station 21.

Preferably, during the butt-joining step (b), a number of straight-thread strips 7, 107, 207 of between two and twenty could be butt-joined to one another, and more preferentially, four, five, or up to ten straight-thread strips can be butt-joined (abreast) to form the straight-thread ply 3.

This number of straight-thread strips 7, 107, 207 will more preferentially be used to form a straight-thread ply 3, the frontal width W3 of which will exceed 75% of the cutter inlet width W8, and will preferentially be between 80% and 100%, or between 90% and 100%, of said cutter inlet width W8.

It could be conceivable to prepare and then butt-join, within one and the same straight-thread ply 3, in accordance with the disclosure, straight-thread strips 7, 107, 207 with different frontal widths W7, W107, W207, and/or which have different structures and/or compositions, in particular depending on the geometry and the properties that are desired to be conferred on the straight-thread ply 3.

This being the case, according to one possibility of the disclosure, the majority of the straight-thread strips 7, 107, 207, that is to say more than half the whole number of straight-thread strips 7, 107, 207 that are butt-joined to form the straight-thread ply 3, have one and the same frontal width W7, W107, W207.

In a particularly preferential manner, all of the straight-thread strips 7, 107, 207 that are butt-joined to form the straight-thread ply 3 have one and the same frontal width W7, W107, W207.

This makes it possible in particular, here too, to streamline the production of the straight-thread strips 7, 107, 207, since all of the straight-thread strips having one and the same frontal width can advantageously be output by one and the same calender 10.

Moreover, the stores of reinforcing thread 4 and, if need be, the stores of reels 6, 106, 206 and of straight-thread strips 7, 107, 207 could thus be standardized.

According to a preferential feature that may constitute an disclosure as such, during the preparation step (a), a calender 10 is supplied by one or more reinforcing-thread reels 11 that contain as many separate reinforcing threads 4 as necessary to cover a desired frontal width W7, W107, W207 of a straight-thread strip, said reinforcing-thread reels 11 being chosen such that the length L4_base of each reinforcing thread 4 initially stored on said reinforcing-thread reel or reels 11, known as the "nominal storage length" L4_base, is identical, with a predetermined tolerance less than or equal to 20%, or less than or equal to 5%, or less than or equal to 1%, from one reinforcing thread 4 to another, and, during a calendering operation, a continuous straight-thread strip known as a "rough straight-thread strip" 12, which has the desired frontal width W12 and a length known as the "rough length" L12, which is equal to at least 80%, preferably to at least 90%, to at least 95%, to at least 99%, or even to 100%, of the nominal storage length L4_base is produced on said calender 10, from said reinforcing threads 4, and then said rough straight-thread strip 12 is distributed to a plurality of separate reels 6, 6, 106 of straight-thread strips 7, 107, 207 that are then used jointly during the butt-joining step (b).

Thus:

W7=W107=W207=W12 and

L12=L7+L107+L207+ . . . , meaning that the cumulative length of the straight-thread strips 7, 107, 207 distributed to the reels 6, 106, 206 corresponds substantially to the total length L12 of the rough straight-thread strip 12 from which said straight-thread strips 7, 107, 207 originate.

Advantageously, by aiming for a length L12 of rough straight-thread strip 12 that is close to, or even equal to, the length of the reinforcing thread 4 stored on each of the reinforcing-thread reels 11, the disclosure makes it possible to use up the reinforcing thread 4 charged to the calender 10 in one and the same calendering run.

It is thus possible to produce, without wasting preparation time or raw material, a continuous rough straight-thread strip 12, the total surface area of which corresponds to the product of the frontal width W12 of said rough straight-thread strip 12 and its length L12, that is to say corresponds substantially to the product of the width W12 and the storage length of reinforcing thread L4_base.

Preferably, this useful surface area of rough straight-thread strip will be equal or substantially equal to the surface area of straight-thread ply 3 that is necessary for producing all of the webs 1 for the intended series of tires.

Advantageously, the redistribution of the rough straight-thread strip 12 into a plurality of straight-thread strips 7, 107, 207 corresponding to length portions of said rough straight-thread strip 12, allocated to different reels 6, 106, 206, makes it possible to convert the manufacture of the required surface area of straight-thread ply 3 into a manufacture that is suited to the storage length L4_base of the reinforcing threads 4.

Preferentially, the nominal storage length L4_base of each reinforcing thread stored on the reinforcing-thread reel(s) 11 used by the calender is between 200 m and 70 000 m, preferably between 1000 m, or 2000 m, on the one hand (low value) and 35 000 m on the other hand (high value).

Such nominal storage lengths L4_base correspond in fact to storage standards, thereby making it possible to simplify the supplying of the calender 10.

Moreover, the significant nominal storage length L4_base of the reinforcing threads 4 makes it possible to continuously calender a significant length L12 of rough straight-thread strip 12, substantially equal to the nominal storage length L4_base, and thus to produce, in the majority of specific cases, the entire useful surface area of straight-thread ply 3 necessary for manufacturing a series of several tires 20 from a single rough straight-thread strip 12, and thus from one and the same calendering operation.

Preferably, during the preparation step (a), each of the separate reels 6, 106, 206 receives a portion of the rough straight-thread strip 12 with a length L7, L107, L207 which is between 5% and 50% of the rough length L12, and for example, preferably, between 5% and 25% of said rough length L12.

As indicated above, it is thus possible to transfer and distribute the rough straight-thread strip 12, preferably substantially equally between the different reels 6, 106, 206, to as many straight-thread strips 7, 107, 207 that have a unit length L7, L107, L207 sufficient to produce the desired length L3 of straight-thread ply 3.

In this case, preferably L7=L107=L207 is substantially the case, and even more preferentially, L3=L7=L107=L207 is substantially the case.

Of course, the unit length L7, L107, L207 of each straight-thread strip 7, 107, 207 could be determined so as to correspond substantially to the maximum capacity of the butt-joining station 21, and/or respectively to the maximum capacity of the cutter 8, which defines the maximum volume and/or weight of the reels 6, 106, 206, and 22, respectively, which can be received and unwound by the butt-joining station 21 and the cutter 8, respectively.

In particular, according to a preferential feature that may constitute a wholly separate invention, the total surface area of the webs 1 to be produced, known as the useful web surface area, is generated, during the preparation step (a), by one and the same operation of calendering a rough straight-thread strip 12, the developed surface area of which is between 100% and 120% of said useful web surface area.

It is thus possible to distribute said rough straight-thread strip 12 substantially equally to a predetermined number of separate reels, preferably between 2 and 10, which each receive a corresponding fraction of the developed surface area of the rough straight-thread strip 12, and then to use all of said reels 6, 106, 206 jointly during the butt-joining step (b).

Said predetermined number of reels 6, 106, 206 is preferably equal to the number of straight-thread strips 7, 107, 207 that it is necessary to butt-join abreast in order to achieve the desired width W3 of the straight-thread ply 3.

Preferably, each reel 6, 106, 206 of the plurality of separate reels that are prepared during the preparation step (a) and that is then used jointly with the other reels 6, 106, 206 during the butt-joining step (b), contains a continuous straight-thread strip 7, 107, 207, the length L7, L107, L207 of which is between 200 m and 30 000 m.

Advantageously, it is thus possible to use each straight-thread strip 7, 107, 207 to produce a straight-thread ply 3 of great length, sufficient to produce a plurality of webs 1, and more preferentially sufficient to produce a plurality of reinforcing plies 2, and more particularly a number (and surface area) of reinforcing plies 2 that is sufficient to produce a plurality, or even all, of the tires 20 of the intended series.

Figure 4:
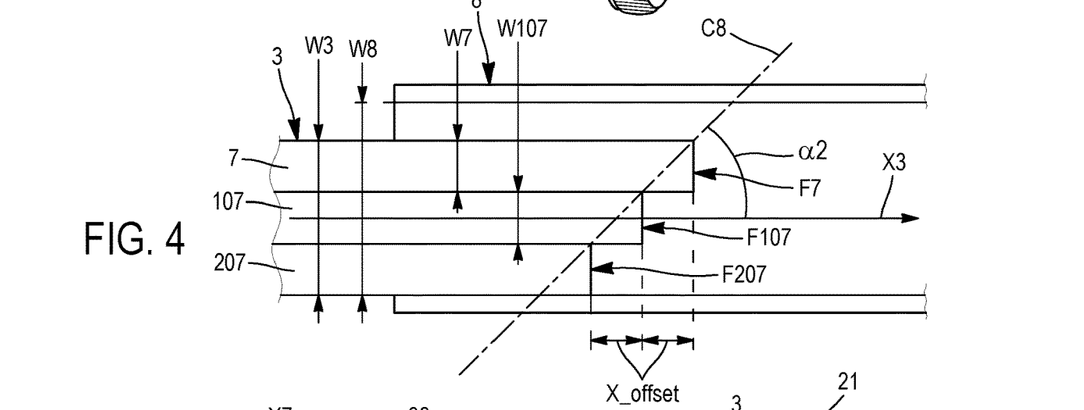
FIG. 4 illustrates a schematic top view of a stepped disposition of the fronts of straight-thread strips depending on the cutting angle provided at the cutter, so as to limit losses of material (wastage) during the first cut carried out on the straight-thread ply.

Furthermore, according to a preferential feature that may constitute a wholly separate invention, and as is illustrated in FIG. 4, if the (desired) cutting direction C8 forms a cutting angle α2 with respect to the common longitudinal direction X3 of the straight-thread ply 3, then, during the initialization of the butt-joining step (b), the straight-thread strips 7, 107, 207 coming from the separate reels 6, 106, 206 may advantageously be presented in a stepped manner by longitudinally offsetting the respective fronts 7F, 107F, 207F of said straight-thread strips with respect to one another at a longitudinal offset X_offset that depends on the value of the cutting angle α2.

More particularly, as is illustrated in FIG. 4, the longitudinal offset X_offset could be defined as a function of the frontal width W7, W107, W207 of each straight-thread strip and the cutting angle α2.

Said longitudinal offset X_offset will preferably be chosen such that the point of intersection of each new strip front 107F with the selvedge of the adjacent strip 7, the front 7F of which is ahead of the front 107F in question with respect to the cutter 8, is situated on the cutting line C8, said cutting line C8 being oriented at the cutting angle α2 with respect to the common longitudinal direction X3 and thus with respect to the selvedges of the strips.

In other words, the longitudinal offset X_offset is chosen such that the gradient of the steps coincides with the cutting direction C8.

Of course, if there is dimensional variety between the different straight-thread strips 7, 107, 207, the choice could be made to define a different longitudinal offset X_offset from one straight-thread strip 7 to the other 107.

In a variant, it is perfectly conceivable, for example to make it easier to butt-join the straight-thread strips 7, 107, 207 without the need to distribute the fronts 7F, 107F, 207F of the straight-thread strips 7, 107, 207 along an excessive length, to choose a longitudinal offset X_offset that corresponds to an angle known as the "mean angle", which is not exactly equal to the cutting angle α2 but corresponds to an angle chosen arbitrarily by the user of the cutter, the orientation of which depends on the orientation of the cutting angle α2, the value of which is preferably close to the value of the cutting angle α2, and thus said value can be for example (slightly) lower, or by contrast (slightly) higher, in terms of absolute value, than the value of said cutting angle.

In all cases, the stepped distribution of the fronts of the straight-thread strips will advantageously make it possible to limit wastage of material, which is lost during the first cut carried out by the cutter 8 on the straight-thread ply 3.

Figure 5:
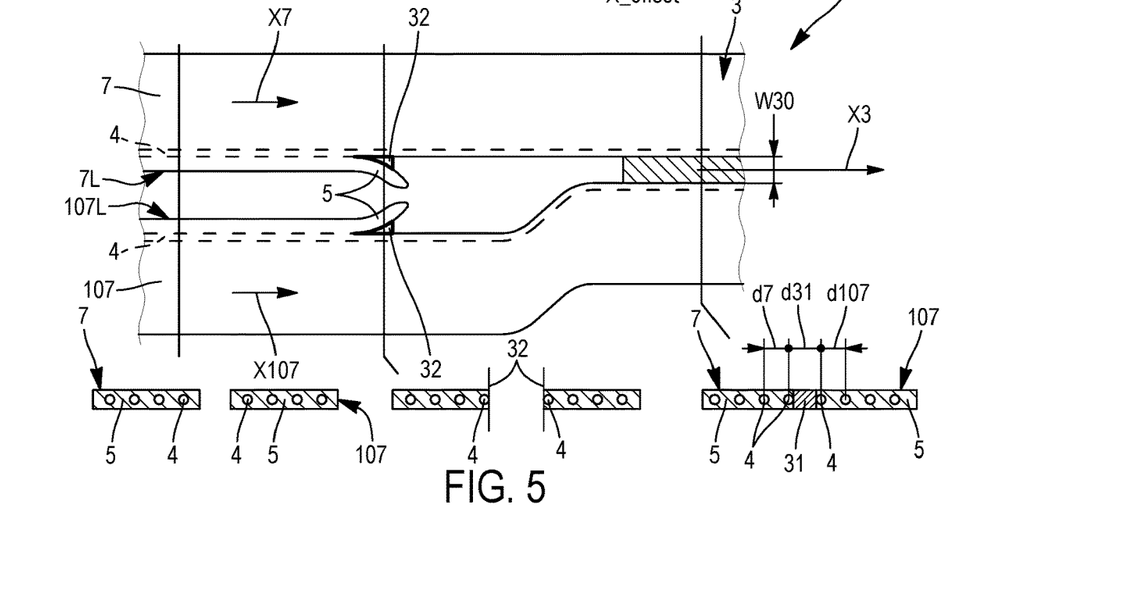
FIG. 5 illustrates a schematic top view, including outlet sections of a variant implementation of butt-joining by adhesive bonding, which can be applied during the implementation of a method according to the disclosure.

Furthermore, according to a preferential embodiment variant that can constitute a wholly separate invention, in particular independently, if need be, of the dimensions of the straight-thread strips 7, 107, 207 and/or of the dimensions of the straight-thread ply 3 or of any relationship between said dimensions and a cutter width W8, it is possible that, during the butt-joining step (b), the straight-thread strips 7, 107, 207 are disposed in parallel in pairs, such that said straight-thread strips have their respective selvedges 7L, 107L facing one another and such that said selvedges 7L, 107L are spaced apart from one another and delimit, between one another, a gap known as the "join gap" 30 of predetermined width W30, and said straight-thread strips 7, 107 can be butt-joined by injecting into the join gap 30 a malleable filling material 31, of the rubber or glue type, which bonds the selvedge 7L of one of the straight-thread strips 7 to the selvedge 107L of the other straight-thread strip 107, as is illustrated in FIG. 5.

Advantageously, the use of a malleable filling material 31, which adapts itself in shape and volume to the width W30 of the join gap 30 without itself imposing a dimensional spacing constraint between the strips 7, 107 makes it possible to carry out butt-joining in which the spacing between two adjacent straight-thread strips 7, 107 is managed very precisely, and more particularly in which the spacing pitch d31 (measured from centre to centre) between the two reinforcing threads 4, each belonging to one of the butt-joined strips, which are closest to one another is managed very precisely.

Note in this regard that, preferably, the width W30 of the join gap 30 will be chosen such that the spacing pitch d31 between the two closest reinforcing threads 4, which belong to two separate straight-thread strips 7, 107 and are situated facing one another, on either side of the join gap 30, is equal to the pitch d7, d107 at which the reinforcing threads 4 are arranged along the width of at least one of the two straight-thread strips 7, 107 in question, and preferably of each of the two straight-thread strips 7, 107 in question.

Thus, with reference to the last cut in FIG. 5, preferably d31=d7, or d31=d107, and preferably, if d7=d107, d31=d7=d107.

If need be, the filling material 31 could have one or more properties different from those of the rubbers 5 of the straight-thread strips 7, 107.

In particular, provision could be made for the filling material 31 to be more electrically conductive than the rubbers 5.

By way of indication, the rubber(s) 5 of the straight-thread strips could be weakly electrically conductive, and for example have a resistivity equal to or greater than $10^8$ ohms/cm (100 MΩ/cm), whereas the filling material 31 could have a resistivity less than $10^6$ ohms/cm (1 MΩ/cm).

It would then be possible to create, through the thickness of the straight-thread ply 3 that results from butt-joining, a conductive path that would advantageously make it possible to avoid the accumulation of electric charges when the vehicle is rolling, ensuring the evacuation of said electric charges through the tire 20.

Similarly, a filling material 31 could be chosen that has mechanical properties, in particular a tensile strength, that are different from those of the rubbers 5 of the straight-thread strips 7, 107, in order to adjust the properties of the composite straight-thread ply 3 obtained by butt-joining.

The filling material 31 could be dispensed by any appropriate method that ensures the malleability of the filling material 31, and appropriate metering (in volume or in weight per unit time) of said material.

To this end, an extrusion method could in particular be used.

According to a preferential feature that may constitute a wholly separate invention, in particular if at least one of the straight-thread strips 7, 107, 207 contains metallic reinforcing threads 4, and preferably if at least two of the straight-thread strips 7, 107, 207 contain metallic reinforcing threads 4, it could be possible, during the preparation step (a) or during the butt-joining step (b), to trim at least one selvedge 7L, 107L of said straight-thread strip or, respectively, said straight-thread strips intended to be bonded by the filling material 31, by making said straight-thread strip or, respectively, said straight-thread strips 7, 107, 207 run in contact with a knife 32 that bears in a sliding manner against the, preferably metallic, reinforcing thread 4 that is closest to the selvedge 7L, 10L in question, such that the relative movement of the straight-thread strip or, respectively, the straight-thread strips 7, 107 with respect to the knife 32 makes it possible to eliminate, before butt-joining, any residual width of rubber 5 that covers the, preferably metallic, reinforcing thread 4, specifically in order to expose the, preferably metallic, reinforcing thread 4 along the length of the selvedge 7L, 107L in question, as is illustrated in FIG. 5, such that the lateral limit of said, preferably metallic, reinforcing thread 4 delimits the join gap 30 that receives the filling material 31.

Note that this trimming using the knife 32 can be carried out either at the outlet of the calender, so as to pre-trim the straight-thread strips 7, 107, 207 before they are stored on the reels 6, 106, 206, or, preferably, at the inlet of the butt-joining station 21, when said straight-thread strips 7, 107, 207 are unwound in order to be butt-joined.

Note in this regard that, compared with anticipatory trimming carried out in the calender 10, the solution of trimming at the butt-joining station 21 makes it advantageously possible to reduce the risks of the exposed reinforcing wire 4 being damaged by corrosion or detaching from the straight-thread strip 7, 107 during the handling of said straight-thread strip or the conveying of said straight-thread strip within the butt-joining station 21.

Advantageously, the application of the knife 32 directly to the reinforcing wire 4, tangentially to the latter, by exerting a lateral pressure of the knife 32 on the selvedge 7, 107 of the strip, while the straight-thread strip 7, 107 is running in its longitudinal direction X7, X107, makes it possible to guide the blade of the knife 32 and to scrape and peel any excess rubber 5 laterally covering said reinforcing thread 4, without effort.

Advantageously, the knife 32 could be fixed with respect to the frame of the machine (calender 10 or butt-joining station 21) without being driven at an own cutting speed, thereby simplifying the placement and regulation of the cutting position of said knife.

Optionally, although preferably being fixed, the knife 32 could be returned mechanically against the straight-thread strip 7, 107 by means of an elastic member, for example of the spring type, or by means of an appropriately controlled motorized member, of the actuating cylinder kind.

Advantageously, the trimming of the selvedges 7L, 107L with the knife 32 makes it possible to obtain very neat borders of straight-thread strips 7, 107, thereby favouring the precision of the positioning of said straight-thread strips during butt-joining, in particular when each of the two straight-thread strips is trimmed along the selvedge that allows it to be joined to the other straight-thread strip.

In particular, in this way, it would be possible to reproducibly define the width W30 of the join gap 30 that it is appropriate to provide in order to respect the spacing pitch d31 between the two reinforcing threads 4 bordering the join between the straight-thread strips 7, 107, and in particular to ensure the continuity of the pitch d7, d31, d107 between the straight-thread strips 7, 107 on passing through said join.

If need be, when one or more straight-thread strips 7, 107, 207 that contain electrically conductive reinforcing threads 4, and in particular metallic reinforcing threads 4, are joined together using a filling material 31 that is more electrically conductive than the rubbers 5 of said strips, trimming with the knife 32 makes it possible to place said filling material 31 into contact with at least one conductive reinforcing thread 4, or preferably into contact with both conductive reinforcing threads 4 that border the join gap 30, thereby improving the quality of the conductive path for carrying electric charges in the axial direction of the reinforcing threads 4 and the join.

This is particularly appreciable if the straight-thread ply 3 is intended to form a radial carcass ply, since it is then possible to use the reinforcing threads 4 to transport the electric charges from the head and the sidewalls of the tire to the rim, or vice versa.

If need be, the principle of trimming could be applied to any type of reinforcing thread 4, including non-metallic ones, as long as said reinforcing thread 4 is sufficiently resistant to abrasion with respect to the knife 32 chosen.

Of course, the present disclosure is in no way limited only to the embodiment variants described in the preceding text, a person skilled in the art being notably capable of isolating or freely combining one or another of the abovementioned features with one another, or of substituting equivalents therefor.

In this regard, the present disclosure relates in particular to all or part of a part of an installation such as the one shown in FIGS. 2A and 2B.

In particular, the present disclosure relates to an installation for manufacturing webs 1, comprising, as illustrated in FIG. 2B:

an unwinding station designed to receive a plurality of separate reels 6, 106, 206 that each contain a straight-thread strip 7, 107, 207 formed of a plurality of continuous reinforcing threads 4 that are embedded in at least one layer of rubber 5 and extend parallel to one another in the longitudinal direction X7, X107, X207 of said strip, and to simultaneously unwind said straight-thread strips 7, 107, 207, and a butt-joining station 21, which makes it possible to butt-join said straight-thread strips 7, 107, 207 in pairs in one and the same common longitudinal direction X3, so as to combine all of said straight-thread strips into a straight-thread ply 3, the reinforcing threads 4 of which extend in the common longitudinal direction X3, and which has, perpendicularly to said reinforcing threads 5, a straight-thread ply frontal width W3 that is greater than the individual frontal width W7, W107, W207 of each straight-thread strip, and a cutter 8 according to the disclosure.

This installation could advantageously be dimensioned according to any one of the configurations or combinations of configurations described in the preceding text.

More particular, since the cutter 8 has a given inlet width W8, the unwinding station, in particular the size of the reels 6, 106, 206 and/or the size of the reel holders, and the butt-joining station, will preferably be arranged so as to be able to produce, from straight-thread strips 7, 107, 207, the widest of which has a frontal width W7, W107, W207 less than or equal to 50%, preferably less than or equal to 40%, preferentially less than or equal to 25%, optionally, preferably, less than or equal to 10%, or even less than or equal to 5%, of said cutter inlet width W8, a straight-thread ply 3, the frontal width W3 of which is equal to or greater than 50%, preferably equal to or greater than 75%, preferentially equal to or greater than 80%, or even equal to or greater than 90%, of the cutter inlet width W8.

More preferentially, the installation could be dimensioned so as to produce a straight-thread ply 3 with a frontal width of between 80% and 100% of the cutter inlet width W8, from straight-thread strips 7, 107, 207 with a frontal width W7, W107, W207 less than or equal to 40% of the cutting inlet width W8, and preferably between 5% and 20% of said cutter inlet width W8.

Finally, the present disclosure likewise relates as such to a subassembly of the abovementioned installation, as illustrated in FIG. 1, said subassembly comprising an unwinding station designed to receive a plurality of separate reels 6, 106, 206 that each contain a straight-thread strip 7, 107, 207 and to unwind said straight-thread strips 7, 107, 207, a butt-joining station 21, and an outlet station for storing the straight-thread ply 3 output from the butt-joining station 21 on a buffer reel 22.

As indicated above, it is thus possible, before any operation of cutting into webs 1, in this case directly after butt-joining, to store the straight-thread ply 3 on a buffer reel 22, situated upstream of the cutter 8, and then to subsequently use said straight-thread ply 3 in a cutter 8 according to the disclosure by unwinding said straight-thread ply 3 from said buffer reel 22 in order to convey said straight-thread ply 3 to said cutter 8.

Preferably, as is illustrated in FIG. 1, the unwinding station will be provided with a collecting device for collecting, preferably on spools, the inserts 23 used for storing the straight-thread strips 7, 107, 207 on the reels 6, 106, 206.

Similarly, the outlet station will preferably be provided with a feed device designed to provide an insert 24 of suitable width to the straight-thread ply 3, which will be wound up with said straight-thread ply 3 on the buffer reel 22.

What is claimed is:

1. A method for manufacturing webs that are intended to be involved in the makeup of a reinforcing ply for a tire, said method comprises the following steps:

(i) a preparation step (a), during which a plurality of separate reels are prepared, each containing a strip, known as a "straight-thread strip", which is formed of a plurality of continuous reinforcing threads that are embedded in at least one layer of rubber and extend parallel to one another in a longitudinal direction of said strip, each of said straight-thread strips having, perpendicularly to its reinforcing threads, a predetermined width known as the "frontal width"; then (ii) a butt-joining step (b), during which the straight-thread strips contained on said plurality of separate reels are unwound simultaneously, and said straight-thread strips are butt-joined in pairs in one and the same common longitudinal direction, so as to combine all of said straight-thread strips into a straight-thread ply, the reinforcing threads of which extend in the common longitudinal direction, and which has, perpendicularly to said reinforcing threads, a straight-thread ply frontal width that is greater than the individual frontal width of each straight-thread strip; then (iii) a cutting step (c), during which the straight-thread ply is inserted into a cutter that has a given maximum cutting capacity, known as the "cutter inlet width", which corresponds to the largest frontal width of a straight-thread ply that can be inserted into the inlet of said cutter, then, by means of said cutter, the straight-thread ply is severed transversely, several times over, in a cutting direction that is secant to the direction of the reinforcing threads, so as to form portions of straight-thread ply known as "webs" of predetermined length; and wherein the frontal width of the straight-thread ply that is produced during the butt-joining step (b) and then inserted into the cutter during the cutting step (c) is equal to or greater than 50% of the cutter inlet width, whereas the widest frontal width of the straight-thread strips that are butt-joined to make said straight-thread ply is less than or equal to 50% of said cutter inlet width.

2. The method according to claim 1, wherein, during the preparation step (a), a calender is supplied by one or more reinforcing-thread reels that contain as many separate reinforcing threads as necessary to cover a desired frontal width of a straight-thread strip, in that the length of each reinforcing thread initially stored on said reinforcing-thread reel or reels, known as the "nominal storage length", is identical, with a predetermined tolerance less than or equal to 20%, from one reinforcing thread to another, and in that, during a calendering operation, a continuous straight-thread strip known as a "rough straight-thread strip", which has the desired frontal width and a length known as the "rough length", which is equal to at least 80% of the nominal storage length is produced on said calender, from said reinforcing threads, and then said rough straight-thread strip is distributed to a plurality of separate reels of straight-thread strips that are then used jointly during the butt-joining step (b).

3. The method according to claim 2, wherein, during the preparation step (a), each of the separate reels receives a portion of the rough straight-thread strip with a length of between 5% and 50% of the rough length.

4. The method according to claim 2, wherein the nominal storage length of each reinforcing thread stored on the reinforcing-thread reel(s) used by the calender is between 200 m and 70 000 m.

5. The method according to claim 1, wherein each straight-thread strip used has a frontal width of between 5% and 20% of the cutter inlet width.

6. The method according to claim 1, wherein the straight-thread strips each have a frontal width of between 30 mm and 700 mm.

7. The method according to claim 1, wherein the cutter inlet width is between 300 mm and 2000 mm.

8. The method according to claim 1, wherein each reel of the plurality of separate reels that are prepared during the preparation step (a) and that is then used jointly with the other reels during the butt-joining step (b), contains a continuous straight-thread strip, the length of which is between 200 m and 30 000 m.

9. The method according to claim 1, wherein the total surface area of the webs to be produced, known as the useful web surface area, is generated, during the preparation step (a), by one and the same operation of calendering a rough straight-thread strip, a developed surface area of which is between 100% and 120% of said useful web surface area, and in that said rough straight-thread strip is distributed substantially equally to a predetermined number of separate reels that each receive a corresponding fraction of the developed surface area of said rough straight-thread strip, and then all of said reels are used jointly during the butt-joining step (b).

10. The method according to claim 1, wherein the cutting direction forms a cutting angle with respect to the common longitudinal direction of the straight-thread ply, and in that, during the initialization of the butt-joining step (b), the straight-thread strips coming from the separate reels are presented in a stepped manner by longitudinally offsetting respective fronts of said straight-thread strips with respect to one another at a longitudinal offset that depends on the value of the cutting angle.

11. The method according to claim 1, wherein, during the butt-joining step (b), the straight-thread strips are disposed in parallel in pairs, such that said straight-thread strips have respective selvedges facing one another and such that said selvedges are spaced apart from one another and delimit, between one another, a gap known as the "join gap" of predetermined width, and in that said straight-thread strips are butt-joined by injecting into the join gap a malleable filling material of rubber or glue which bonds the selvedge of one of the straight-thread strips to the selvedge of the other straight-thread strip.

12. The method according to claim 11, wherein, during the preparation step (a) or during the butt-joining step (b), at least one selvedge of said straight-thread strip or, respectively, said straight-thread strips intended to be bonded by the filling material is trimmed by making said straight-thread strip or, respectively, said straight-thread strips run in contact with a knife that bears in a sliding manner against the reinforcing thread that is closest to the selvedge in question, such that the relative movement of the straight-thread strips with respect to the knife makes it possible to eliminate, before butt-joining, any residual width of rubber that covers the reinforcing thread, specifically in order to expose the reinforcing thread along the length of the selvedge in question, such that a lateral limit of said reinforcing thread delimits the join gap that receives the filling material.

13. The method according to claim 12, wherein at least one of the straight-thread strips contain metallic reinforcing threads, such that, during the preparation step (a) or during the butt-joining step, at least one selvedge of said straight-thread strip or, respectively, said straight-thread strips intended to be bonded by the filling material is trimmed by making said straight-thread strip or, respectively, said straight-thread strips run in contact with the knife that bears in a sliding manner against the metallic reinforcing thread that is closest to the selvedge in question, such that the relative movement of the straight-thread strips with respect to the knife makes it possible to eliminate, before butt-joining, any residual width of rubber that covers the metallic reinforcing thread, specifically in order to expose the metallic reinforcing thread along the length of the selvedge in question, such that a lateral limit of said metallic reinforcing thread delimits the join gap that receives the filling material.

* * * * *